US010834905B2

(12) United States Patent
Cote

(10) Patent No.: US 10,834,905 B2
(45) Date of Patent: Nov. 17, 2020

(54) BIRD FEEDER WITH RAIN DEFLECTOR

(71) Applicant: Paul L. Cote, Lac Brome (CA)

(72) Inventor: Paul L. Cote, Lac Brome (CA)

( * ) Notice: Subject to any disclaimer, the term of this patent is extended or adjusted under 35 U.S.C. 154(b) by 269 days.

(21) Appl. No.: 15/932,724

(22) Filed: Apr. 12, 2018

(65) Prior Publication Data
US 2019/0313608 A1 Oct. 17, 2019

(51) Int. Cl.
A01K 39/00 (2006.01)
A01K 39/012 (2006.01)
A01K 39/01 (2006.01)

(52) U.S. Cl.
CPC ........ A01K 39/012 (2013.01); A01K 39/0113 (2013.01)

(58) Field of Classification Search
USPC ......... 119/51.01, 52.3, 57.8, 52.2, 52.4, 57.9
See application file for complete search history.

(56) References Cited

U.S. PATENT DOCUMENTS

| 3,090,354 | A | * | 5/1963 | Merritt | A01K 39/0113 119/52.4 |
| 4,327,669 | A | * | 5/1982 | Blasbalg | A01K 39/0113 119/57.8 |
| 5,150,665 | A | * | 9/1992 | Boaz | A01K 39/0113 119/52.3 |
| 6,158,385 | A | * | 12/2000 | Boyd | A01K 39/0113 119/52.3 |
| 6,543,383 | B1 | * | 4/2003 | Cote | A01K 39/012 119/52.2 |
| 6,895,894 | B2 | * | 5/2005 | Fort, II | A01K 39/012 119/51.01 |
| 7,735,453 | B2 | * | 6/2010 | Vosbikian | A01K 39/012 119/52.2 |
| 8,931,434 | B2 | * | 1/2015 | Tu | A01K 39/01 119/51.01 |
| 9,826,719 | B1 | * | 11/2017 | Myrberg, III | A01K 39/0113 |
| 2008/0127902 | A1 | * | 6/2008 | Bent N. | A01K 39/012 119/52.3 |
| 2008/0156269 | A1 | * | 7/2008 | Greenwood | A01K 39/0106 119/51.01 |

* cited by examiner

Primary Examiner — Yvonne R Abbott-Lewis
(74) Attorney, Agent, or Firm — Eric Fincham

(57) ABSTRACT

A bird feeder with a plurality of feed openings in the seed tube base, and a deflector located above the seed tube base, the deflector extending outwardly above the feed openings such that the deflector is able to deflect water flowing downwardly from said seed tube to a location intermediate the feed openings.

10 Claims, 13 Drawing Sheets

BIRD FEEDER WITH RAIN DEFLECTOR

FIELD OF THE INVENTION

This invention relates to U.S. application Ser. No. 15/932,468 filed Mar. 2, 2018, the teachings of which are hereby incorporated by reference.

The present invention relates to bird feeders and more particularly, relates to a bird feeder designed to minimize problems with seed spoilage.

BACKGROUND OF THE INVENTION

The pastime of feeding birds is a very popular one. This is self evident from the number of bird feeders which are sold in the marketplace.

One problem which always exists is the danger of wet bird seed. Despite the use of well designed bird feeders, seed can still become wet due to the weather. Although some bird feeders are designed with wide covers, a wind driven rain will still tend to enter the seed ports from which the birds feed.

Seeds, with enough moisture, can begin to sprout. Moreover, bird seed can spoil if moisture is present for a sufficiently long period of time. If the birds eat the moldy seeds, it is almost inevitable that they will become ill with an avian disease. Fungus and bacterial infections are also a problem for the birds.

Many bird feeders come with instructions that they be emptied and cleaned at regular intervals. However, frequently this is a procedure which is not followed by the end user.

It is therefore desirable to have a bird feeder which is designed to minimize access of rain or other moisture to the interior of the feeder containing the seeds.

SUMMARY OF THE INVENTION

According to one aspect of the present invention, there is provided a bird feeder which comprises a seed tube having a seed tube base, a plurality of feed openings in the seed tube base, and a deflector located above the seed tube base, the deflector extending outwardly above the feed openings, the deflector being designed to deflect water flowing downwardly from the seed tube to a location intermediate the feed openings.

The seed tube is common to many bird feeders and may be formed of different materials and be of different configurations. Frequently, the seed tube is of a generally cylindrical configuration and formed of a transparent material such that visual access may be had to the tube to verify the amount of seed remaining. Naturally, other configurations are possible including a rectangular configuration, a pentagonal configuration, etc.

At the bottom of the seed tube, there is provided a seed tube base upon which the seed rests. The seed tube base may be an intricate part of the seed tube or alternatively, can be a separate component. In the preferred embodiment of the present invention, the seed tube base is separate from the seed tube. This facilitates removal of the seed and cleaning of the seed tube base when required.

The seed tube base will have drainage apertures formed therein such that any excess water may drip onto the ground or other surface above which the seed tube sits.

The seed tube will normally have a cover which may sit directly on the seed tube or alternatively, on a further structure attached to the seed tube. The cover will normally have a wall extending outwardly in order to provide some protection to the lower portion of the seed tube.

A hanger may be incorporated with the cover to permit the hanging of the bird feeder from a suitable support.

Feed openings will be provided either in the seed tube base or the seed tube itself depending upon the particular arrangement desired. Adjacent to the feed openings, there may be provided a perch like structure to allow the birds to roost while feeding.

In one preferred embodiment of the present invention, the bird feeder is of the squirrel resistant type wherein a shroud will lower itself to protect the seed when a sufficient weight is placed thereon. Preferably, the shroud may have an arrangement wherein a spring tension can be adjusted to determine the weight limit to cause activation of the shroud.

The deflector arrangement will comprise a member located above the feed openings. A deflector will comprise a member which extends outwardly above the feed openings such that any water flowing downwardly will be directed away from the feed openings. Preferably, the water is directed from the deflector and is allowed to flow downwardly intermediate the feed openings. The deflector may be located on the seed tube or any other location above the feed openings. In other words, the deflector location will be at least partially dictated by the structure of the seed tube and other components associated therewith. Thus, when, as in the preferred embodiment of the present invention, a funnel and a shroud are utilized, the deflector may be incorporated in a funnel like structure. Alternatively, the deflector could be mounted on the seed tube per se.

To provide even further protection, there may be provided a raised portion surrounding an upper part of the feed openings. This raised portion will serve to further direct any water not caught by the deflector around the feed opening.

BRIEF DESCRIPTION OF THE DRAWINGS

Having thus generally described the invention, reference will be made to the accompanying drawings illustrating embodiments thereof, in which.

DETAILED DESCRIPTION OF THE INVENTION

Figure 1:
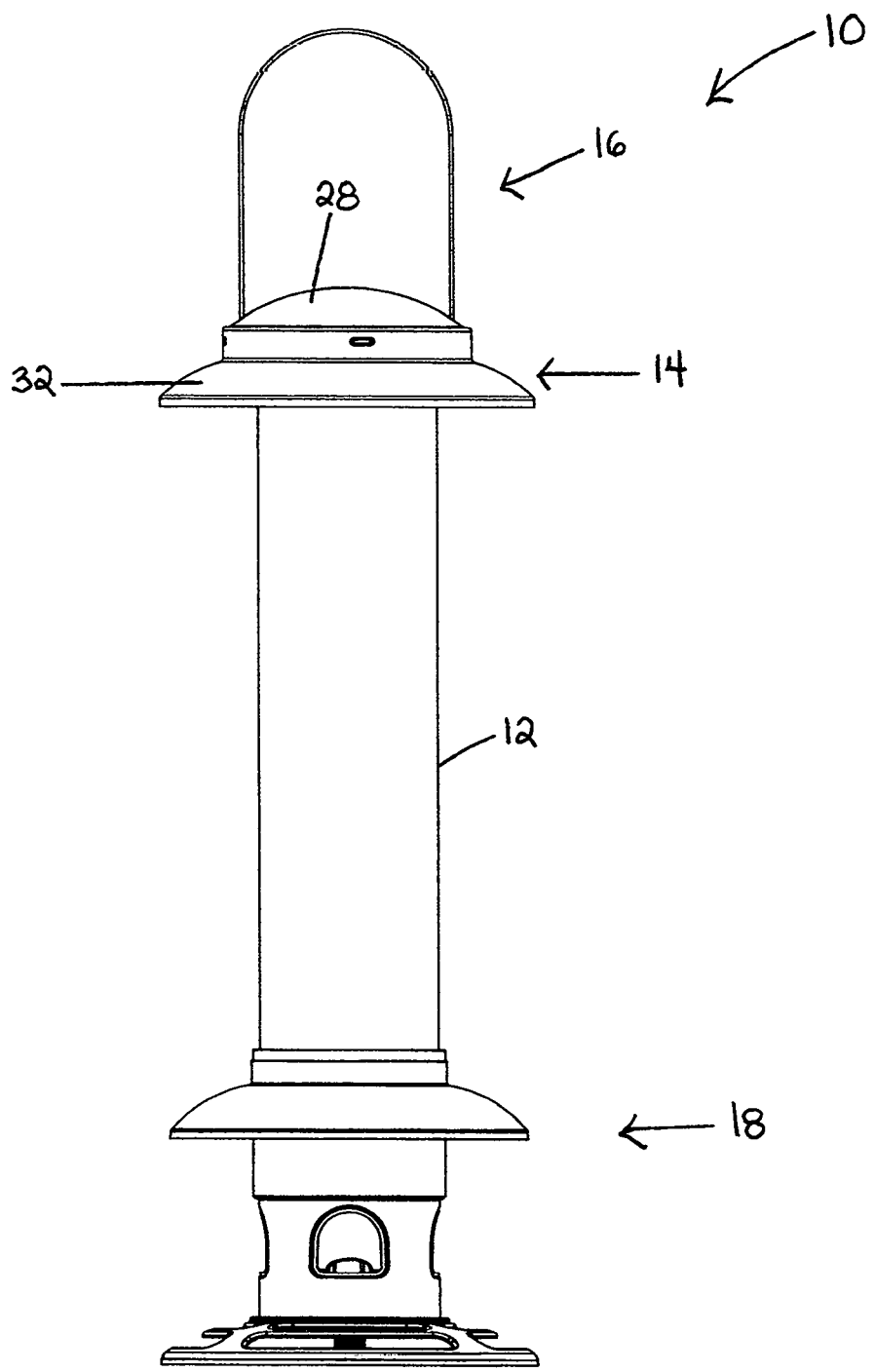
FIG. 1 is a front elevational view of a bird feeder according to an embodiment of the present invention.

Referring to the drawings in greater detail and by reference characters thereto, there is illustrated a bird feeder which is generally designated by reference numeral 10.

Bird feeder 10 includes a seed tube 12 which is of a cylindrical configuration (although other configurations could be utilized) and is preferably formed of a transparent plastic material.

A cover is generally designated by numeral 14 and a hanger is generally designated by reference numeral 16. A shroud 18 surrounds the lower portion of seed tube 12 and will be discussed in greater detail hereinbelow.

A base structure is generally designated 20 and includes a seed tube base 22, a funnel 24 and a shroud 26.

Cover 14 includes a top portion 28 which is contiguous with a side wall 30. A diagonally extending wall 32 extends outwardly to provide protection to seed tube 12 from elements such as rain and the like. A drip edge 34 extends along the outer end of diagonal wall 32. As may be seen in the drawings, side wall 30 has a plurality of protrusions 36 for reasons which will be discussed hereinbelow.

Seated on the upper cylindrical wall of seed tube 12 is a top ring generally designated by reference numeral 38. Top ring 38 includes a lower wall portion 40 which surrounds the top of seed tube 12. An outwardly sloping wall 42 is designed to assist in flowing of the bird seed.

An exterior side wall 44 extends from the upper marginal edge of sloping wall 42. Protrusions 46 are located on exterior side wall 44. Similarly, there are provided recesses 48 therein. Both protrusions 46 and recesses 48 are designed to engage with protrusions 36 on cover side wall 30 so that upon a rotational movement, cover 14 may be locked with top ring 38.

Slots 50 are provided in sloping wall 42 to permit hanger 16 to move therewithin when rotational movement of cover 14 is applied.

Figure 2:
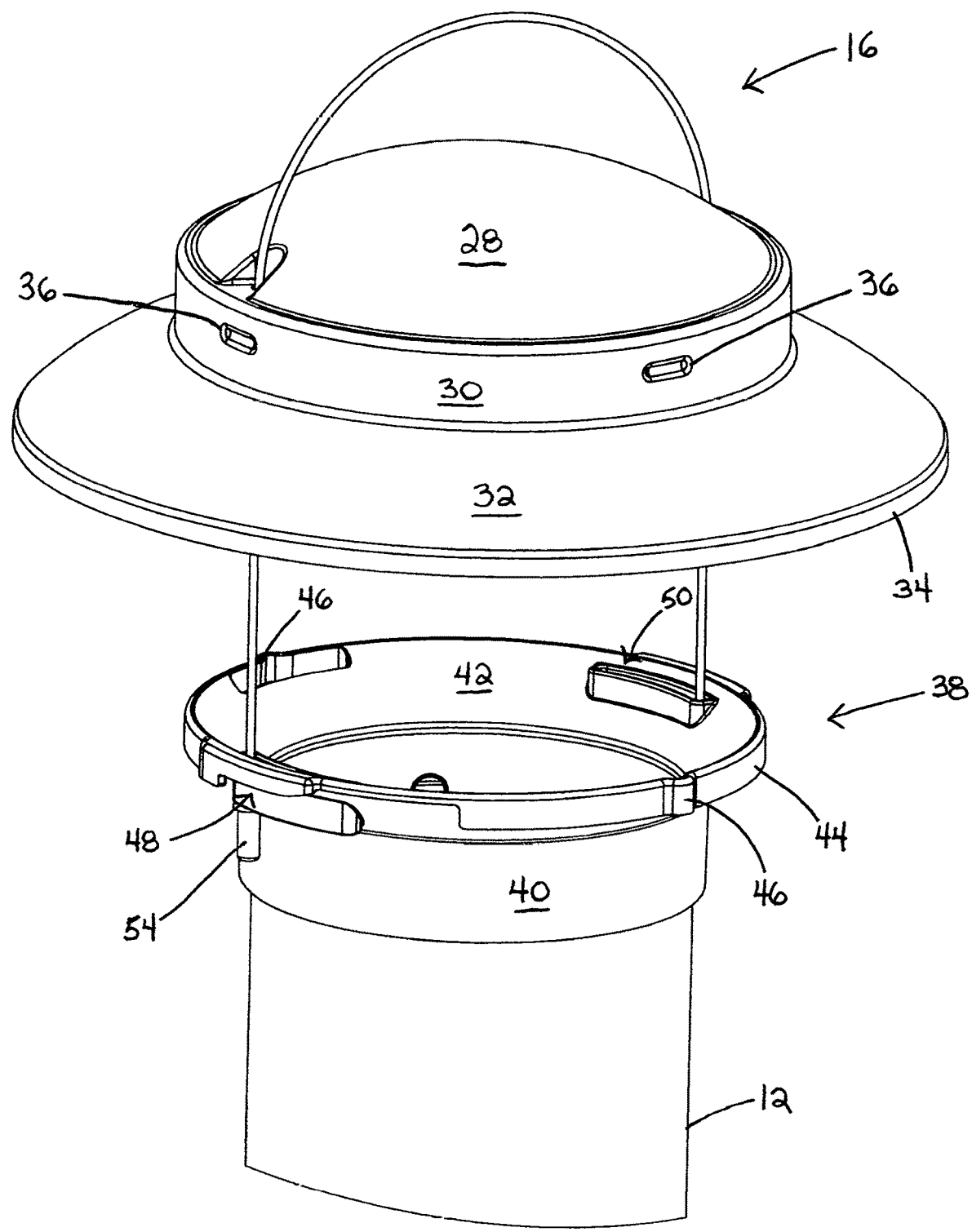
FIG. 2 is a perspective view of the upper portion of the bird feeder of FIG. 1 with the cover in a raised position.
Figure 3:
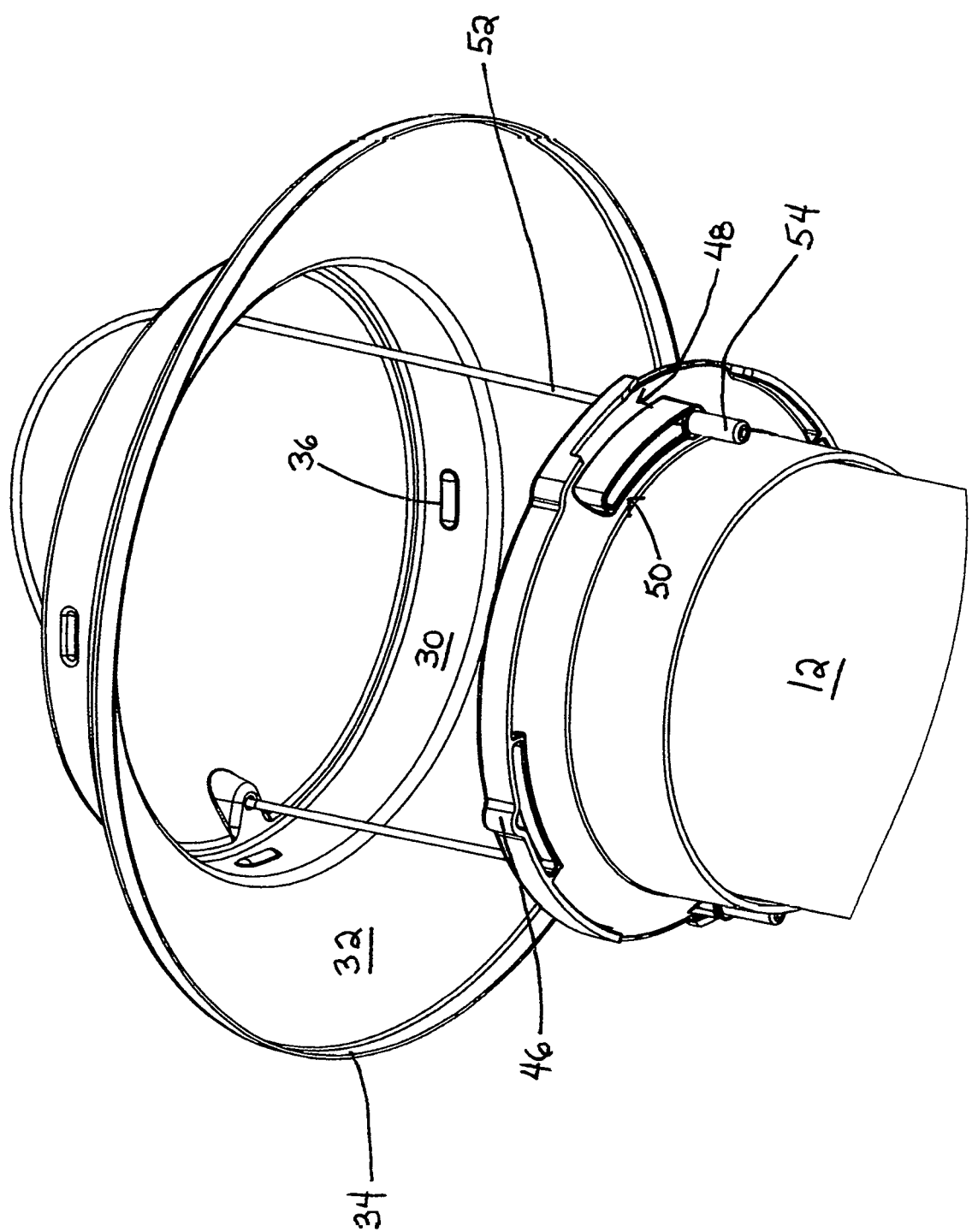
FIG. 3 is a perspective view of the underside of the cover of FIG. 2.
Figure 4:
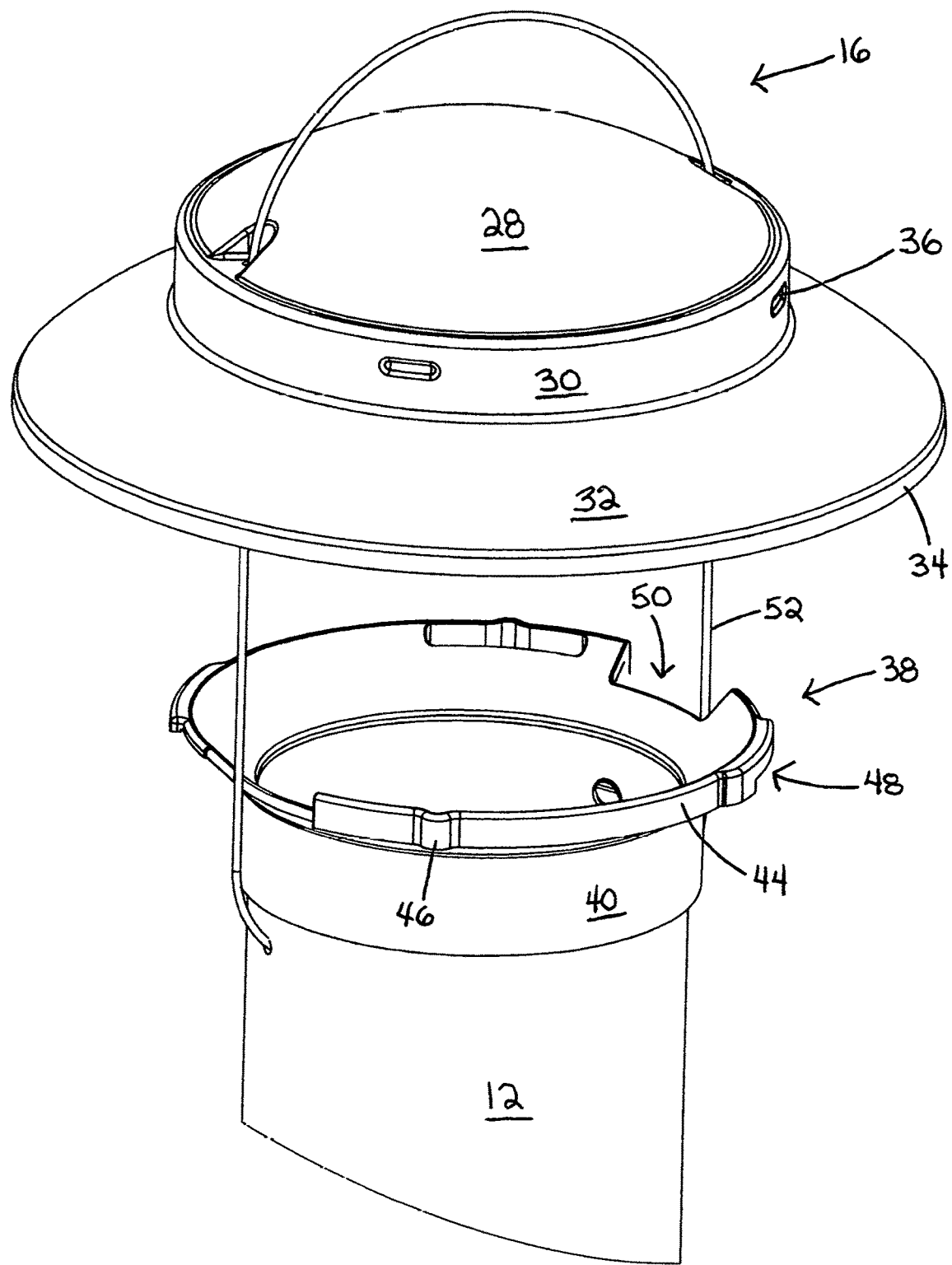
FIG. 4 is a perspective view of the cover in a raised position in a further embodiment of the present invention.
Figure 5:
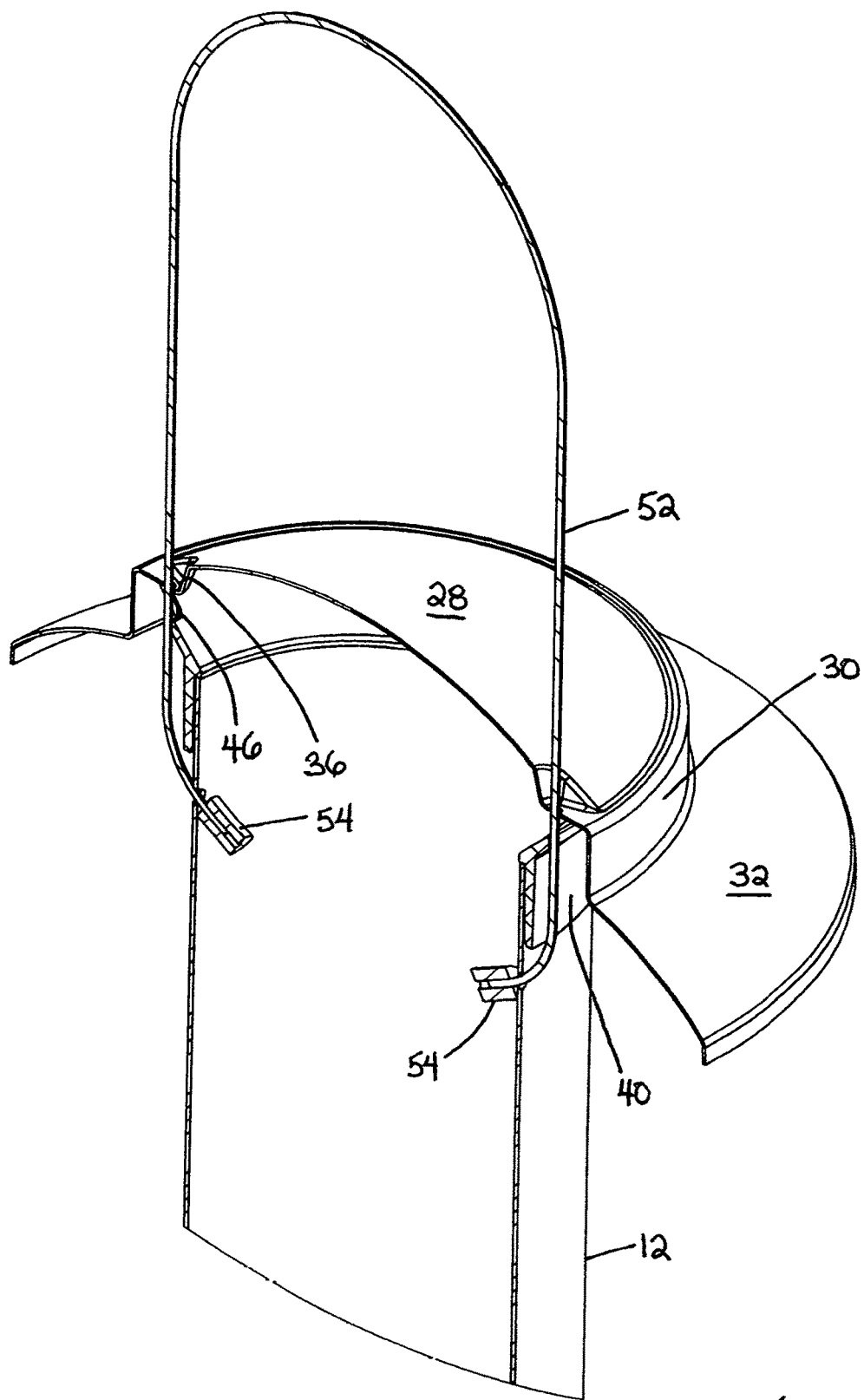
FIG. 5 is a perspective cross-sectional view of the upper portion of the bird feeder of FIG. 4.

As shown in FIGS. 2 and 3, wire 52 which forms hanger 16 is provided with slugs 54 at the free end thereof such that the cover is retained in position. In an alternative embodiment in FIG. 4, wire 52 passes through the side wall of seed tube 12 instead of engaging with the underside where slots 50 are formed.

Figure 7:
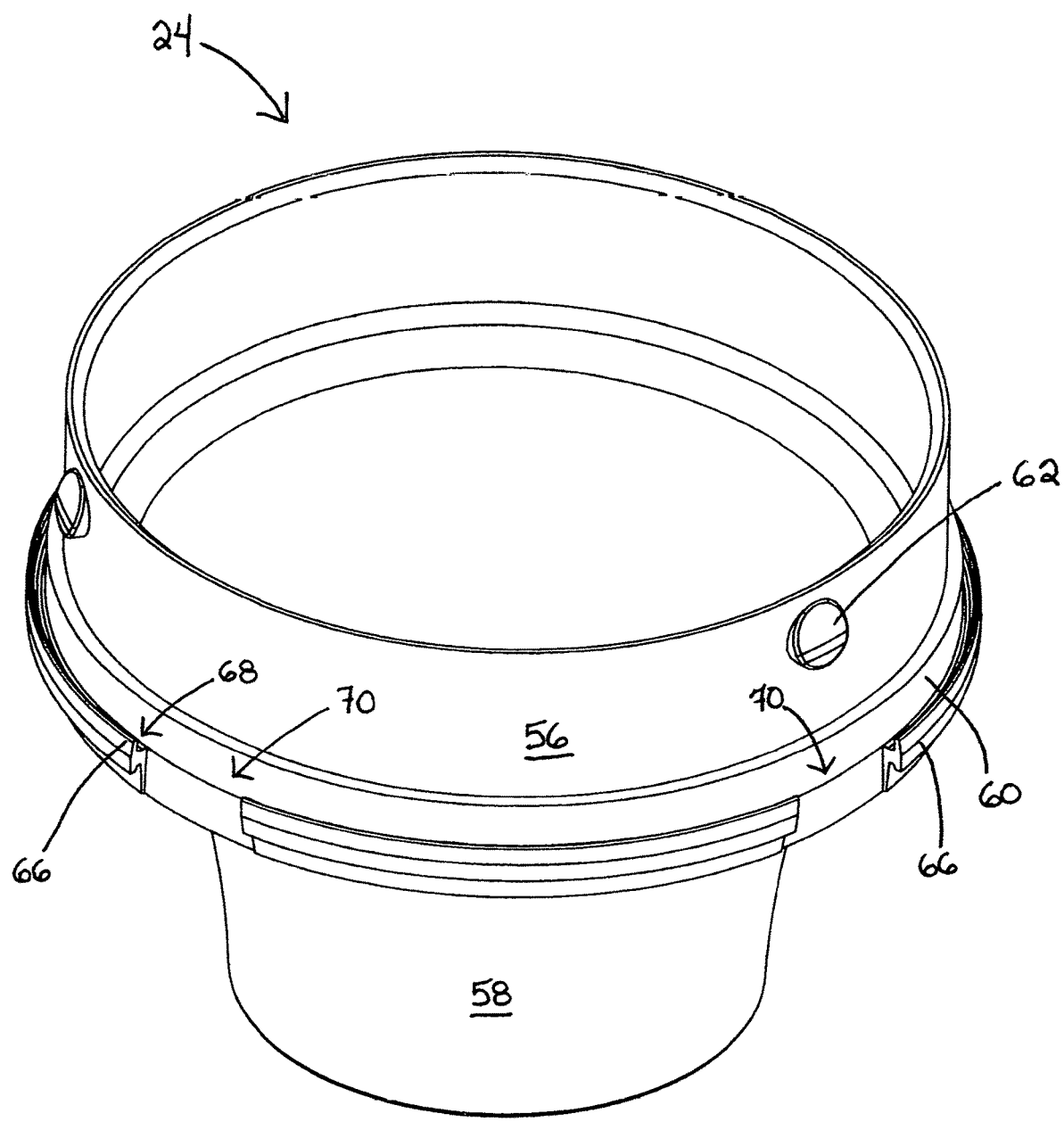
FIG. 7 is a perspective view of the funnel portion of FIG. 6.
Figure 8:
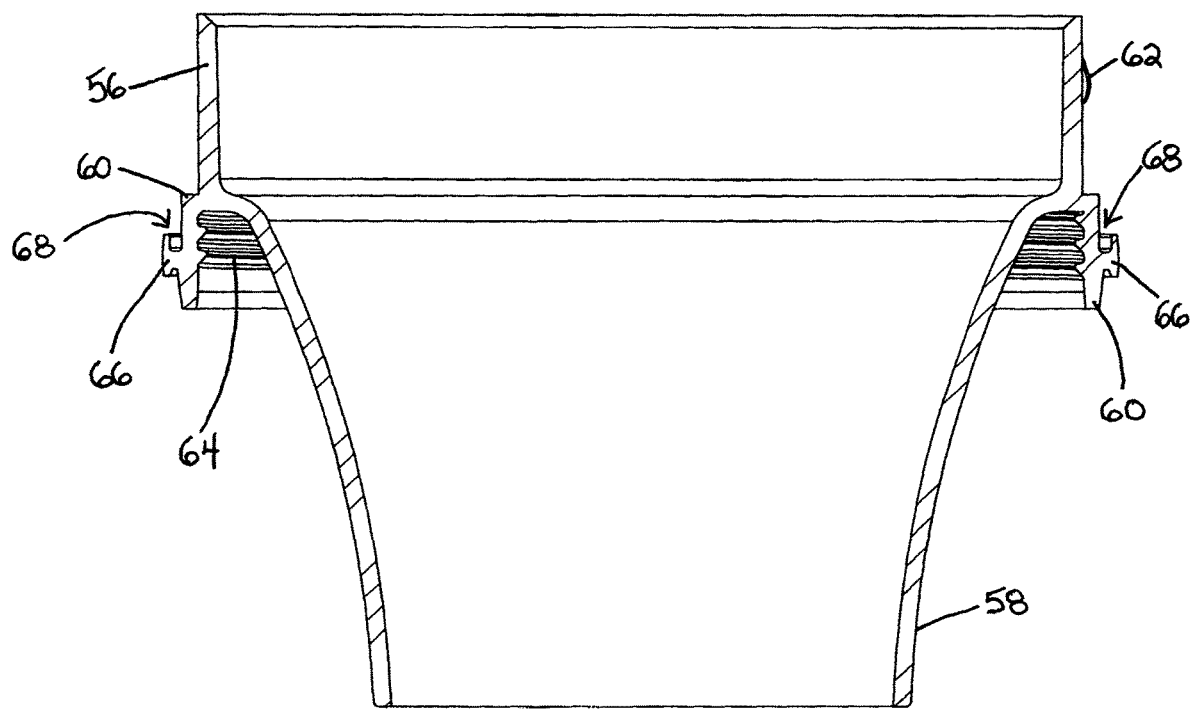
FIG. 8 is a cross-sectional view thereof.
Figure 9:
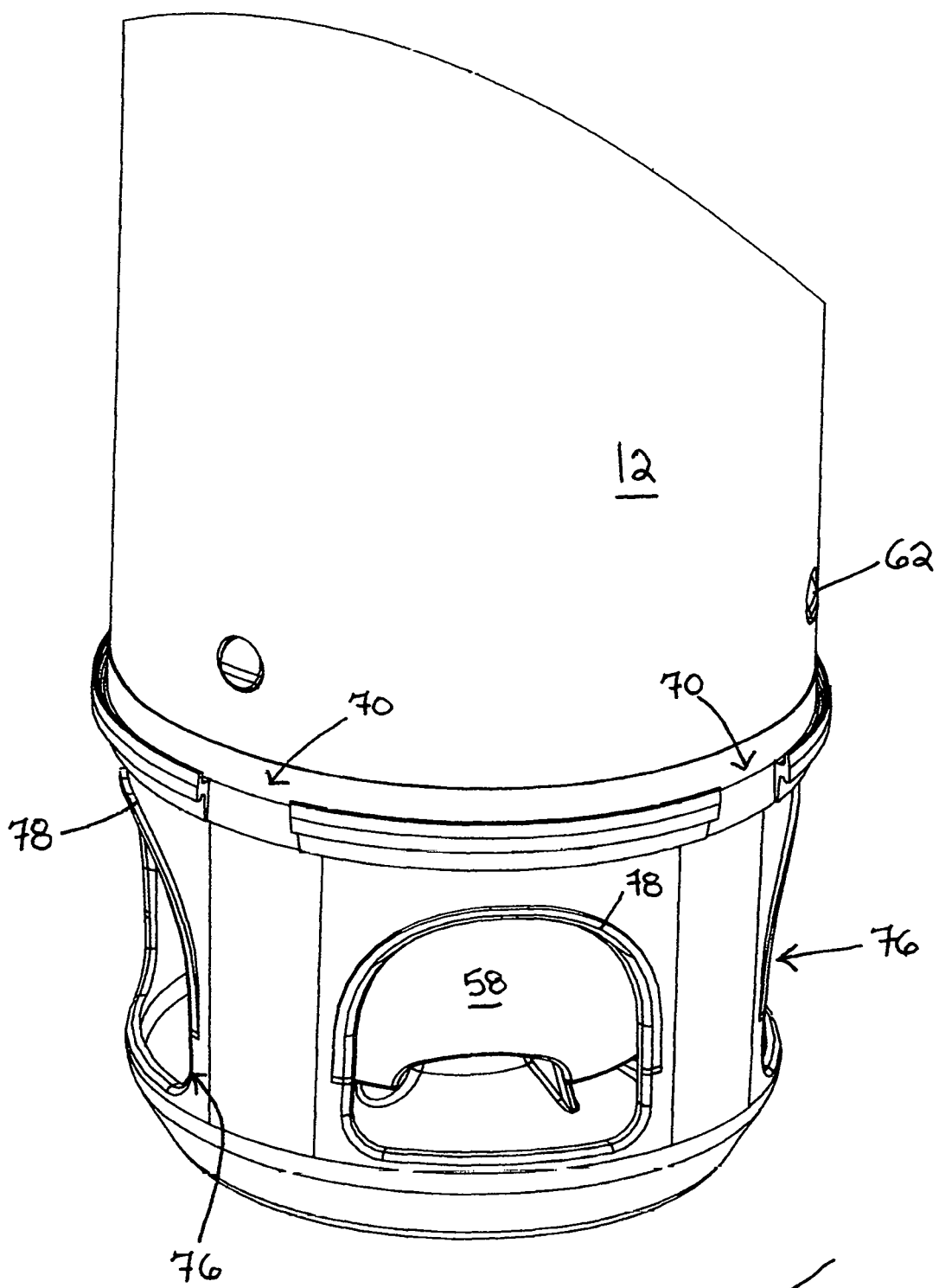
FIG. 9 is a perspective view of the funnel, seed tube base and seed tube.
Figure 10:
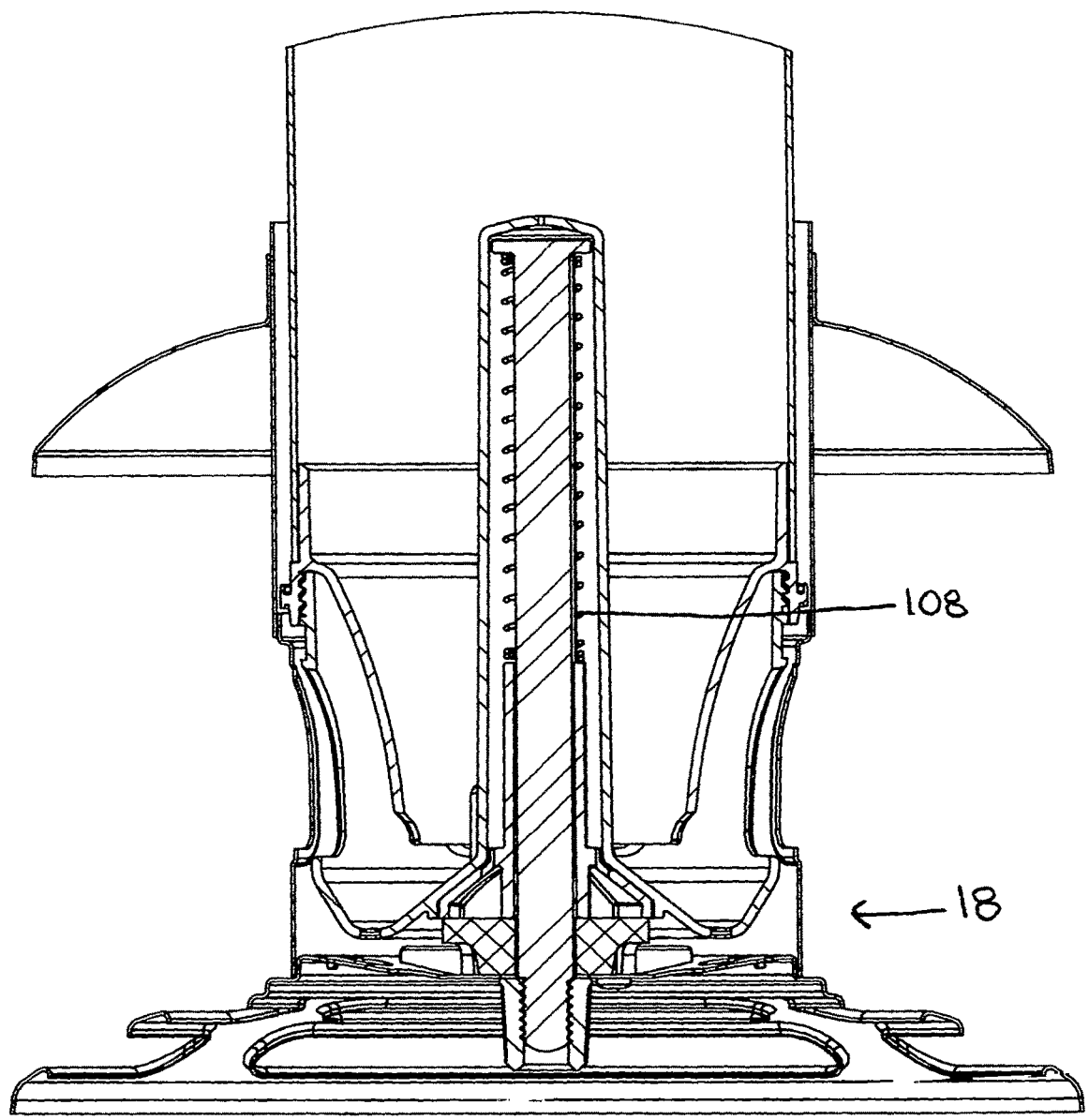
FIG. 10 is a cross-sectional view of the bottom portion of the bird feeder in a normal position.
Figure 11:
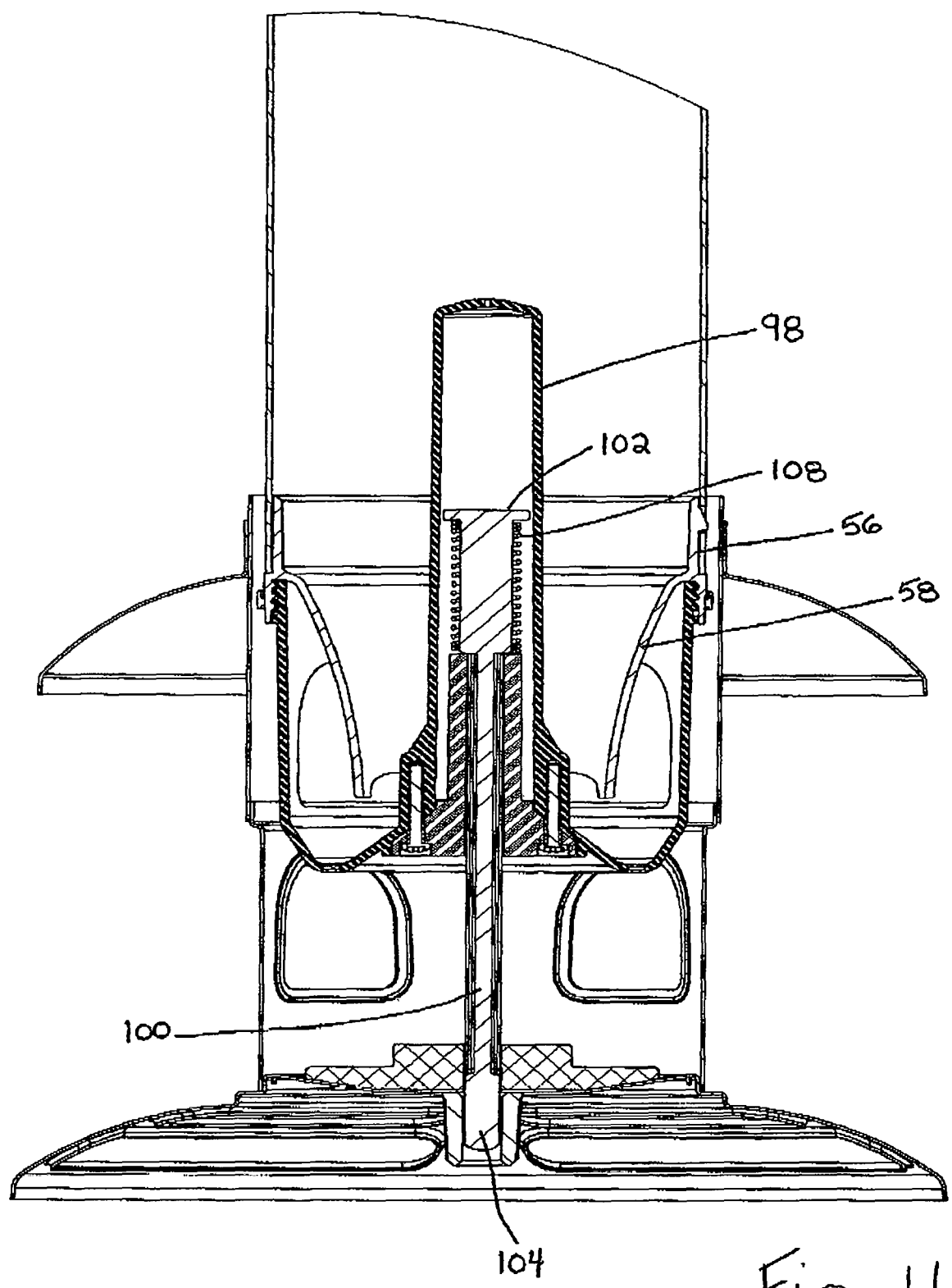
FIG. 11 is a view of a bird feeder when in a position to deny access to the seed tube.

Funnel 24, as seen in FIG. 7, has an upper side wall 56 and a lower funnel wall 58. Intermediate upper side wall 56 and lower funnel wall 58, there is a flange 60 which extends downwardly from upper side wall 56. Locking protrusion 62 fits within an aperture formed in seed tube 12. The interior wall of flange 60 includes screwthreads 64. Extending circumferentially of flange 60 are a plurality of drip members 66. Drip members 66 are designed so as to have a channel 68 formed therein. Drip members 66 extend circumferentially of flange 60 with a channel 68 being formed therein to channel any rain or water to gaps 70 which exist between drip members 66.

Figure 6:
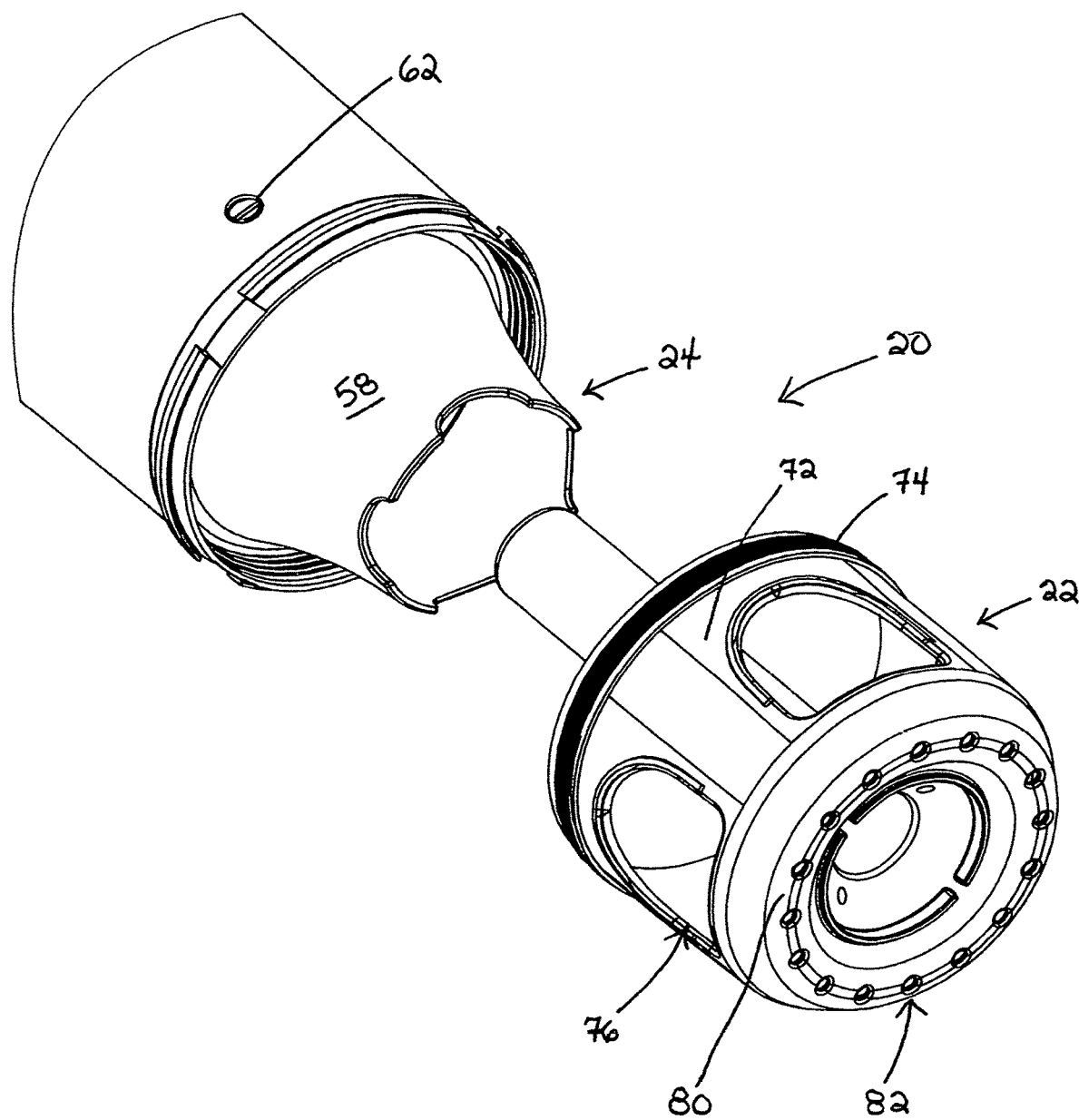
FIG. 6 is an exploded view of the base structure of the bird feeder.

Seed tube base 20, as seen in FIG. 6, has a side wall 72. Side wall 72 has, at its upper extremity, screwthreads 74 which are designed to mate with screwthreads 64 on funnel 24. Seed tube base 22 has a plurality of feed openings 76 formed therein. As may be seen in FIG. 6, each feed opening 76 has a raised portion 78 surrounding the top of feed openings 46 and extending downwardly along the side of feed openings 76. As may also be seen in FIG. 6, a bottom wall 80 of seed tube base 22 has a plurality of drainage apertures 82 formed therein. When seed tube base 22 is screwthreadedly engaged with screwthreads 64 on funnel 24, gaps 70 are aligned with the portion of side wall 72 intermediate feed openings 76 such that water may drip down intermediate the feed tube openings 76.

Figure 12:
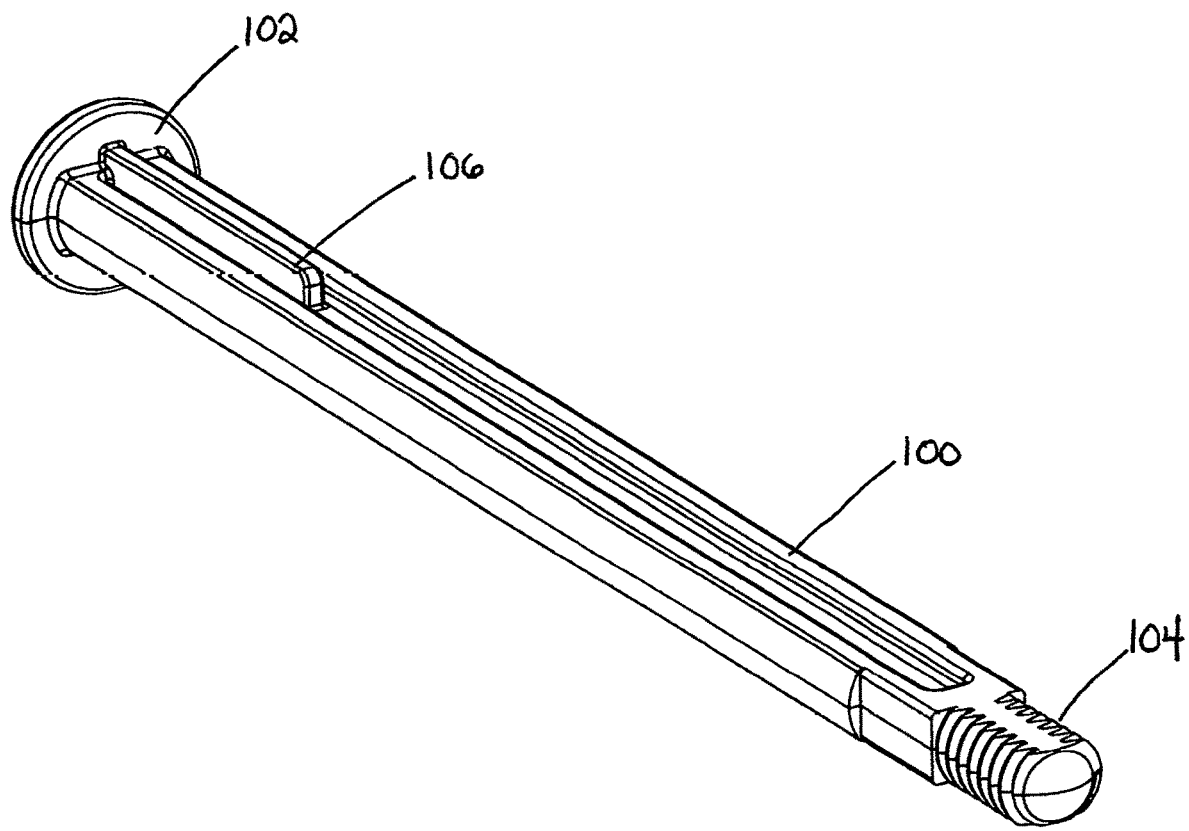
FIG. 12 is a perspective view of a member which abuts one end of the spring.
Figure 13:
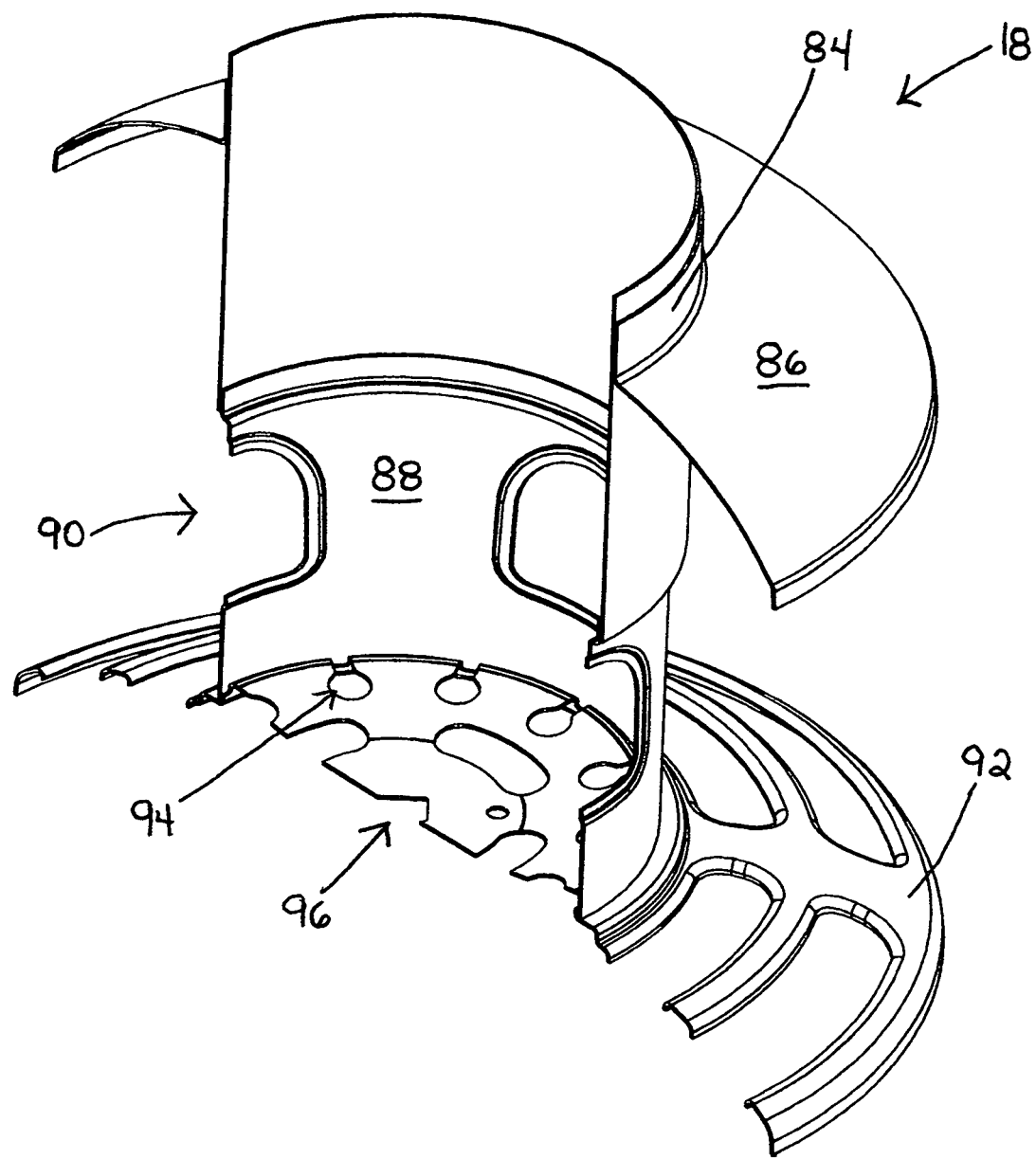
FIG. 13 is a perspective cross-sectional view of the shroud.

Referring back to seed tube base 22, there is illustrated a cylindrical housing 98. Mounted internally of cylindrical housing 98 is a rod 100 which is best illustrated in FIG. 12. Rod 100 has, at an upper end thereof, a flange 102. At the other end, there is provided a threaded rectangular portion 104. Optionally, rod 100 may have a rib 106 at an upper end thereof. Surrounding rod 100 is a coil spring 108 which is biased, at one end thereof, against flange 102 and at the other end thereof, spring 108 is biased against portion 110.

It will be understood that the above described embodiment is for purposes of illustration and that changes and modifications may be made thereto without departing from the spirit and scope of the invention.

I claim:

1. A bird feeder comprising:
   a seed tube having a seed tube base;
   a plurality of feed openings in said seed tube base; and
   a deflector located above said seed tube base, said deflector extending outwardly above said feed openings, said deflector being designed to deflect water flowing downwardly from said seed tube to a location intermediate said feed openings.

2. The bird feeder of claim 1 wherein said deflector has a U-shaped configuration in cross-section, said U-shaped configuration forming a channel to receive said water.

3. The bird feeder of claim 2 including gaps in said deflector, said gaps being located intermediate said feed openings.

4. The bird feeder of claim 3 wherein said deflector is covered by a shroud.

5. The bird feeder of claim 1 further including raised portions proximate said feed openings, each of said raised portions being arranged to deflect any water flowing downwardly to a position away from said feed openings.

6. The bird feeder of claim 5 wherein said raised portions have a first thickness at a position directly above a feed opening, said first thickness diminishing as said raised portion extends downwardly to a side of said feed opening and tapers inwardly along the side of the feed opening.

7. The bird feeder of claim 1 further including a cover arranged to sit on top of said seed tube.

8. The bird feeder of claim 1 wherein said seed tube base comprises a separate member releasably secured to said seed tube.

9. The bird feeder of claim 8 wherein said bird feeder includes a shroud, said shroud being moveable between first and second positions to permit and deny access to said feed openings.

10. The bird feeder of claim 9 further including a baffle, said baffle being formed integrally with said shroud.

* * * * *